R. W. WILLIAMS.
CULTIVATOR ATTACHMENT.
APPLICATION FILED JUNE 15, 1918.
1,354,364.
Patented Sept. 28, 1920.
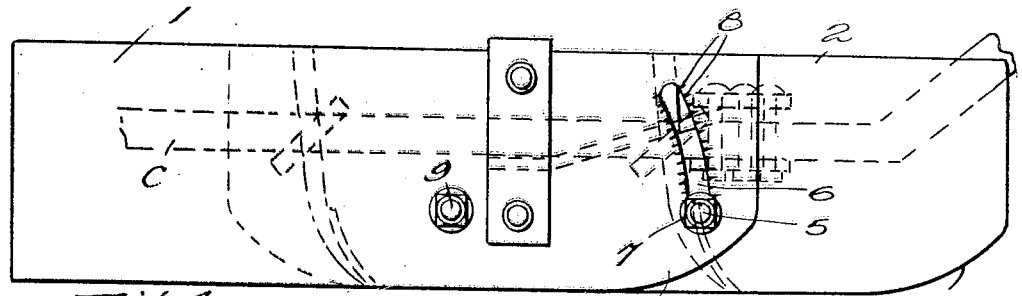
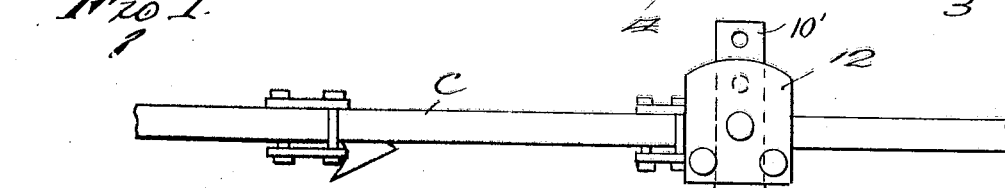
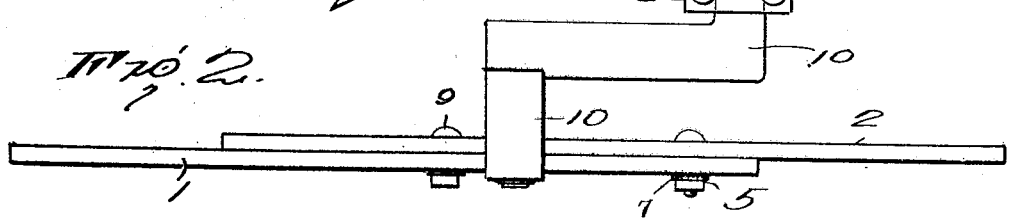
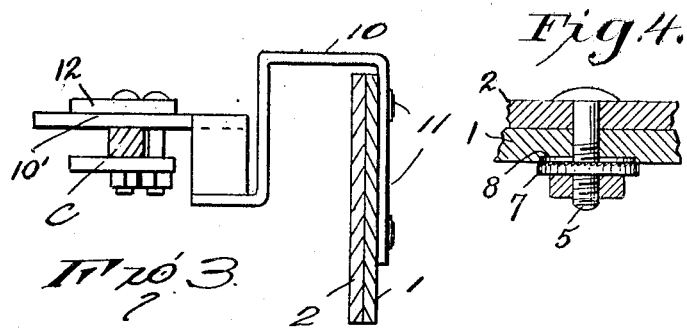
Roy W. Williams,
Inventor
By Geo. P. Kimmel
Attorney

UNITED STATES PATENT OFFICE.

ROY W. WILLIAMS, OF UTICA, SOUTH DAKOTA.

CULTIVATOR ATTACHMENT.

1,354,364.   Specification of Letters Patent.   Patented Sept. 28, 1920.

Application filed June 15, 1918. Serial No. 240,124.

*To all whom it may concern:*

Be it known that I, ROY W. WILLIAMS, a citizen of the United States, residing at Utica, in the county of Yankton and State of South Dakota, have invented certain new and useful Improvements in Cultivator Attachments, of which the following is a specification.

This invention relates to improvements in cultivator attachments and it is the principal object of the invention to provide a novel form of fender adapted for arrangement on a cultivator for preventing the major portion of the dirt or soil turned up by the earth working elements thereof from moving onto the matter growing therein but permitting a small portion of the same to be moved about the roots of such matter to cover the weeds growing thereabout and to maintain the soil in good condition.

It is also an object of the invention to provide a fender of the character mentioned which can be adjusted with relation to the earth working elements in order that the quantity of soil directed over and about the roots of the matter growing can be varied.

Other objects will be in part obvious and in part pointed out hereinafter.

The improvements in the details and arrangement of parts will be apparent from an inspection of the accompanying drawings when considered in connection with the specific description hereinafter contained and wherein the preferred embodiment of the invention is disclosed for the purpose of imparting a full understanding thereof.

In the drawings:

Figure 1 is a side elevation of the improved fender showing the same attached to a portion of a cultivator, Fig. 2 is a top plan view thereof, Fig. 3 is a vertical transverse section therethrough and a portion of the cultivator showing the means for connecting the attachment thereto, and Fig. 4 is a fragmentary detail view of the adjusting means for the fender plates including the serrated washer.

Referring now more specifically to the drawings, in connection with which like reference characters will designate corresponding parts throughout the several views, the improved fender includes plates 1 and 2, the forward end of the plate 2 being curved upwardly adjacent its bottom as at 3 while the forward end of the plate 1 is similarly curved as at 4 for a purpose which will be hereinafter apparent. The adjacent ends of these plates 1 and 2 are arranged in overlapping relation and are connected by means of a bolt 5 secured to the intermediate portion of the blade 2 and extending laterally from one side thereof through an arcuate transverse slot 6 formed in the forward end of the plate 1. The locking nut of the bolt has bearing on a suitable form of serrated washer 7 adapted to be engaged with serrations 8 arranged on the plate 1 at points adjacent the sides of the arcuate slot 6 for an obvious purpose. In this way, it is to be noted that the plates 1 and 2 of the fenders can be adjusted relatively intermediate their ends to permit the passage of dirt turned by the earth working elements of the cultivator thereunder onto and about the roots of the matter growing in the soil. A second bolt 9 is passed through the rear end of the blade 2, which as will be noted is curved and is received through the intermediate portion of the blade 1, thus forming a pivotal connection between said blades to facilitate adjustment of the same. The curved forward end 5 of the plate 2 permits the same to ride upon the soil, while the curved end 4 of the plate 1 avoids this forward corner from protruding beyond the lower edge of the plate 2 on adjustment of said plate.

An angular bracket arm 10 is secured at one end to the forward portion of the plate 1 and in front of the bolt 9 by rivets 11 or similar fastening devices and has the laterally extending end 10' thereof passed through a clamp 12 arranged on the frame of the cultivator, a portion of which is shown and designated by the reference letter *c*. If desired, the bracket arm 10 can be formed of spring metal to permit the fender to automatically adjust itself with relation to the surface of the field over which it is being moved. This, however, is of course optional. Furthermore, the peculiar arrangement of the arm prevents undue upward movement of the pivoted plate 2 when the bolt 5 is removed.

In using the improved fender, the same is secured to the frame of the cultivator in the manner hereinbefore stated and the intermediate portions of the interconnected blades 1 and 2 are adjusted vertically to permit the desired quantity of soil turned up by the earth working elements of the cultivator thereunder onto and about the roots of the matter growing therein. In this way, it will be readily understood that the soil permitted to pass under the fender will thoroughly cover weeds and other undesirable growths arranged about the growing matter, thus, preventing their growth and maintaining the soil in good condition. In this connection, I desire to have it understood that the blades 1 and 2 of the fender can be arranged in any desired positions with relation to the earth working elements of the cultivator, any number of which can be employed. However, it is of course preferable that the blades be so arranged as to receive all earth or soil turned up by these earth working elements during their movement through the same to prevent the major portion thereof from passing onto the growing matter.

Manifestly, the construction shown is capable of considerable modification and such modification as is within the scope of my claim I consider within the spirit of my invention.

I claim:

A cultivator fender comprising two longitudinally disposed plates lapping at their meeting ends, one of the meeting ends of said plates having an arcuate transversely extending slot, a bolt carried by the other plate extending through said slot to adjustably connect said plate ends, a bolt pivotally connecting said lapping ends in rear of said slot and bolt connection, the lower edges of said meeting ends being curved or rounded longitudinally, the front end of the front plate being also similarly curved, an angular bracket for connecting the meeting end of the rear plate to the cultivator frame, said bracket having a laterally extending arm spanning the upper edges of said lapped ends and spaced slightly therefrom forming a stop to limit the upward swing of the front plate.

ROY W. WILLIAMS.